(12) United States Patent
Kasama et al.

(10) Patent No.: US 8,696,061 B2
(45) Date of Patent: Apr. 15, 2014

(54) VEHICLE SEAT

(75) Inventors: Shuji Kasama, Fuchu-cho (JP); Ryota Okimoto, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 82 days.

(21) Appl. No.: 13/413,882

(22) Filed: Mar. 7, 2012

(65) Prior Publication Data
US 2012/0286555 A1 Nov. 15, 2012

(30) Foreign Application Priority Data
May 12, 2011 (JP) .................. 2011-107176

(51) Int. Cl.
*B60N 2/42* (2006.01)
(52) U.S. Cl.
USPC .................. 297/216.14; 297/216.13
(58) Field of Classification Search
USPC ................. 297/284.4, 216.14, 452.6, 452.53, 297/452.52
See application file for complete search history.

(56) References Cited

U.S. PATENT DOCUMENTS

| | | | | | |
|---|---|---|---|---|---|
| 2,709,483 | A | * | 5/1955 | Weinberger | 297/452.52 |
| 3,195,955 | A | * | 7/1965 | Richardson et al. | 297/452.52 |
| 3,328,020 | A | * | 6/1967 | Flint | 267/102 |
| 3,537,752 | A | * | 11/1970 | Kushnarov et al. | 297/452.52 |
| 6,550,859 | B1 | * | 4/2003 | Andersson et al. | 297/216.14 |
| 6,755,476 | B2 | * | 6/2004 | Kawashima et al. | 297/452.52 |
| 2001/0043002 | A1 | * | 11/2001 | Nakane et al. | 297/284.1 |
| 2007/0228789 | A1 | | 10/2007 | McMillen | |

FOREIGN PATENT DOCUMENTS

JP 7-1842 1/1995

OTHER PUBLICATIONS

Communication dated Sep. 4, 2013 for European Appl. No. 12 160 121.5-1758.
Communication dated Sep. 4, 2013.

* cited by examiner

*Primary Examiner* — Milton Nelson, Jr.
(74) *Attorney, Agent, or Firm* — Gerald E. Hespos; Michael J. Porco; Matthew T. Hespos

(57) ABSTRACT

A vehicle seat which comprises a back frame (10) provided inside a seat back (3) to support a headrest (4). The back frame (10) includes right and left side frames (12, 12), and a plurality of support spring members (20B, 20C) having opposite right and left ends (20b, 20c) locked between the right and left side frames (12, 12) and extending in a right-left direction to support a lumber region of an occupant. Each of the support spring members (20B, 20C) is shaped such that a central region thereof protrudes frontwardly relative to the right and left ends thereof in an approximately flat state. Thus, the central region of the support spring unit is largely bent (depressed) rearwardly when a rearward load is applied thereto during a rear impact event.

5 Claims, 5 Drawing Sheets

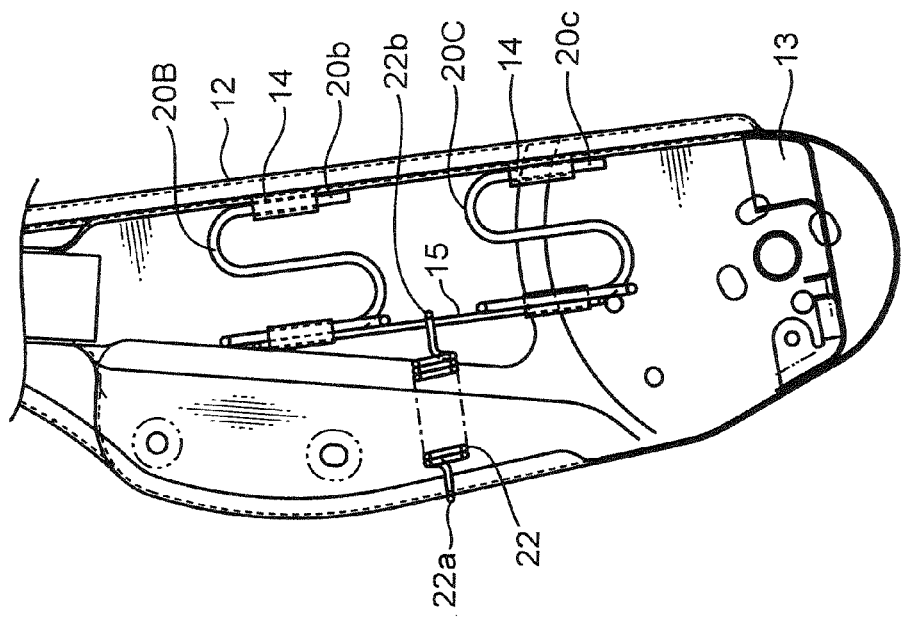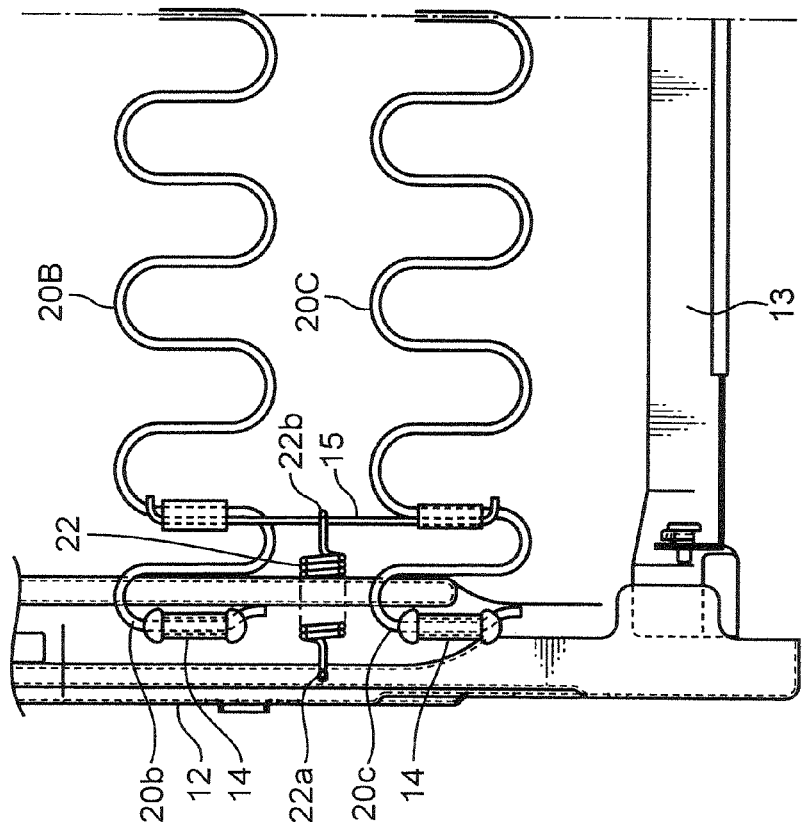

VEHICLE SEAT

TECHNICAL FIELD

The present invention relates to a vehicle seat.

BACKGROUND ART

Heretofore, there has been a vehicle seat which comprises a back frame provided inside a seat back to support a headrest.

For example, JP-U (Japanese Utility Model Laid-Open Publication) 07-001842 (Hereinafter simply 'PTL1') discloses an automobile seat in which a back frame is provided with an impact pressure-receiving frame and a headrest support frame. The impact pressure-receiving frame has a lower end swingably attached to a lower portion of the back frame. On the other hand, the headrest support frame has a vertically central portion swingably attached to an upper portion of the back frame, and a lower end coupled to an upper end of the impact pressure-receiving frame. That is, the headrest support frame is configured such that it is swingingly moved to allow an upper end thereof to be moved frontwardly, in interlocking relation to a rearward inclining movement of the impact pressure-receiving frame.

Thus, during a rear impact event, as the impact pressure-receiving frame is pushed and inclined rearwardly by an occupant, the headrest supported by the upper end of the headrest support frame is moved frontwardly, so that a gap between a head of the occupant and the headrest is reduced to protect the occupant's head.

However, in the PTL 1, the back frame is provided with two frames consisting of the impact pressure-receiving frame and the headrest support frame, and configured to allow the two frames to interlock with each other, which causes a problem of structural complexity.

The present invention has been made to solve the above problem, and an object thereof is to provide a vehicle seat capable of protecting a head of an occupant during a rear impact event with a simple structure.

SUMMARY OF THE INVENTION

In order to achieve the above object, the present invention provides a vehicle seat (1) which comprises: a seat back (3); a headrest (4); and a back frame (10) provided inside the seat back (3) to support the headrest (4), wherein the back frame (10) includes right and left side frames (12, 12), and a support spring unit (20B, 20C) having opposite right and left ends (20b, 20c) locked between the right and left side frames (12, 12) and extending in a right-left direction to support a lumber region of an occupant, and wherein the support spring unit (20B, 20C) is shaped such that a central region thereof protrudes frontwardly relative to the right and left ends thereof in an approximately flat state.

In the present invention, the support spring unit is shaped such that the central region thereof protrudes frontwardly in an approximately flat state. Thus, in a normal state, such as a no-load state or a seated state in which a load applied to the central region of the support spring unit is less than a predetermined value, a rearward bending of the central region is restricted by the support spring unit itself, so that it becomes possible to allow a lumber region of a seated occupant to be adequately supported by the support spring unit.

On the other hand, in a situation where the load applied to the frontwardly protruding central region of the support spring unit becomes equal to or greater than the predetermined value, for example, when a rearward load is applied thereto during a rear impact event, the central region of the support spring unit is largely bent (depressed) rearwardly.

This allows an upper body of the occupant to deeply sink down into the seat back together with the lumber region, so that a gap between a head of the occupant and the headrest is reduced to lessen a load to be imposed on the occupant's head. The rearwardly largely bent (depressed) central region of the support spring unit will automatically return to the frontwardly protruding shape according to its spring force.

As above, the present invention makes it possible to achieve both support of a lumber region of an occupant and protection of a head of the occupant during a rear impact event, with a simple structure in which the support spring unit is configured such that the central region thereof protrudes frontwardly in an approximately flat state.

BRIEF DESCRIPTION OF THE DRAWINGS

FIG. 3A is a fragmentary front view of the back frame.

FIG. 3B is a side view corresponding to FIG. 3A.

FIGS. 5A to 5C illustrate a left half of the seat back, wherein FIG. 5A, FIG. 5B and FIG. 5C are top plan sectional views thereof in a no-load state, in a seated state and during a side impact event, respectively.

DESCRIPTION OF EMBODIMENTS

Figure 1:
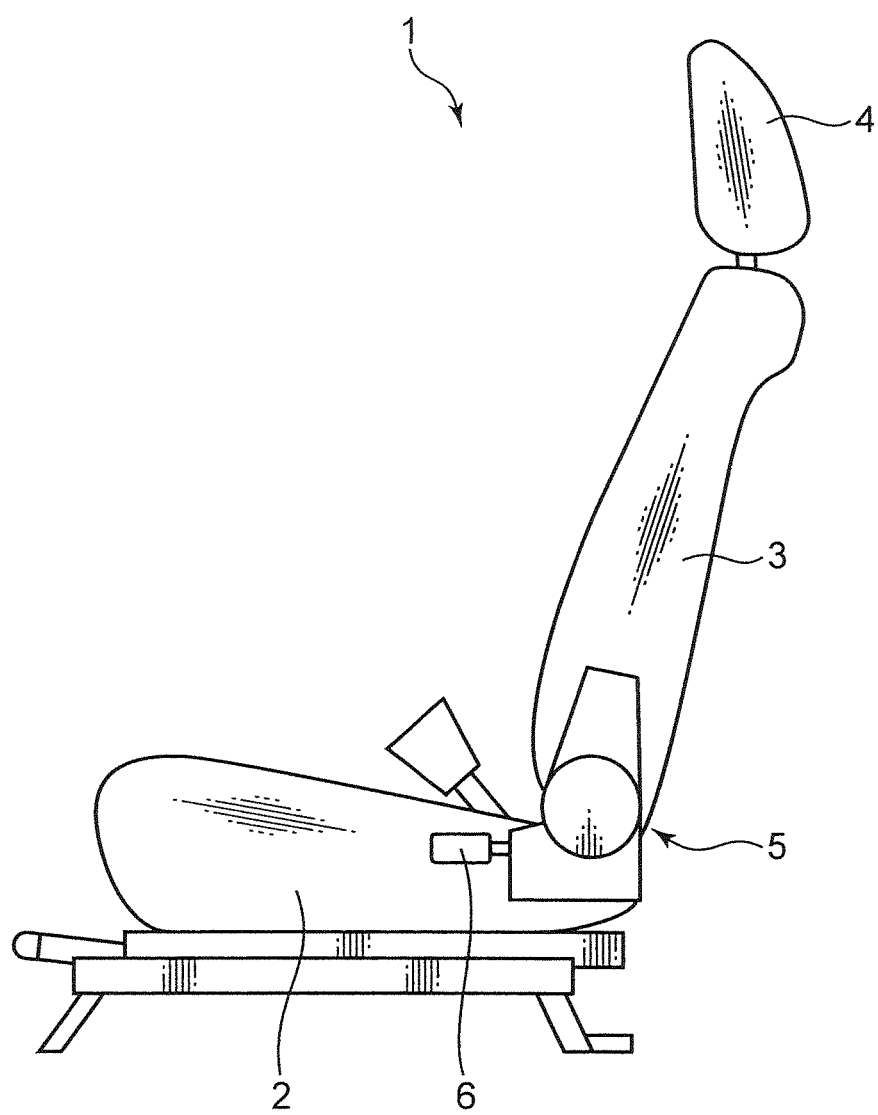
FIG. 1 is a side view of a vehicle seat according one embodiment of the present invention.

An embodiment of the present invention will now be described based on the drawings. FIG. 1 is a side view of a vehicle seat 1 according one embodiment of the present invention.

The vehicle seat 1 comprises a seat cushion 2, a seat back 3 installed to the seat cushion 2 inclinably in a front-rear direction of a vehicle (or reclinably), and a headrest 4 attached to an upper end of the seat back 3. The vehicle seat 1 further comprises a reclining device 5 adapted to couple the seat cushion 2 and the seat back 3 together and adjust an inclination angle of the seat back 3 with respect to the seat cushion 2.

Figure 2A:
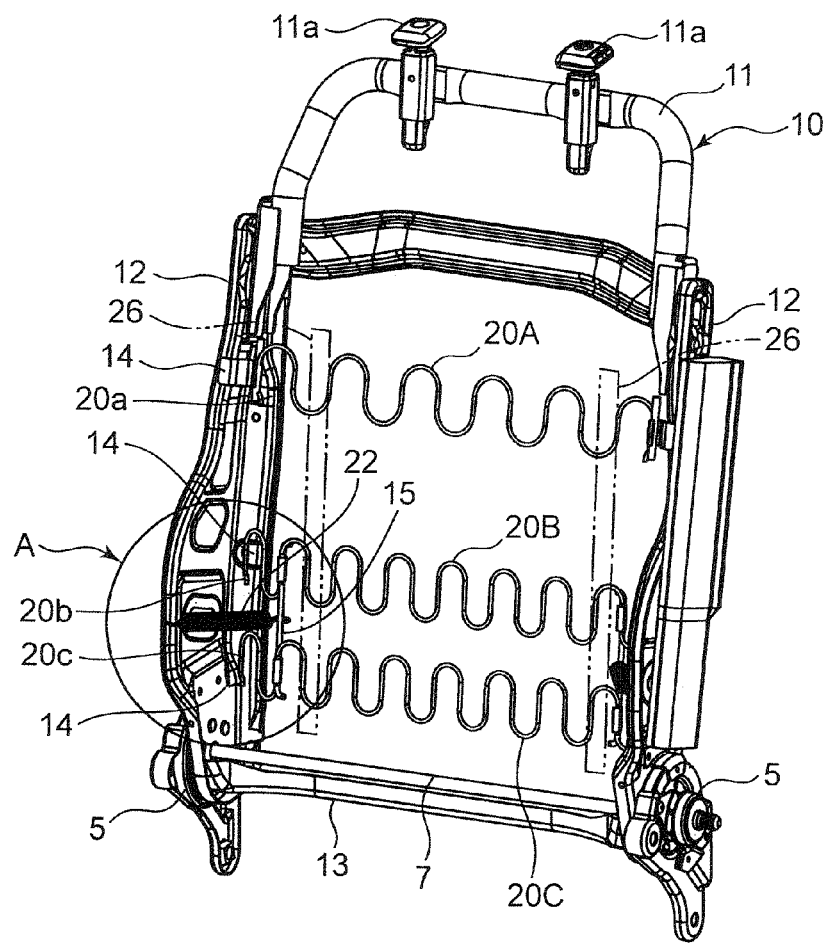
FIG. 2A is a perspective view of a back frame.
Figure 2B:
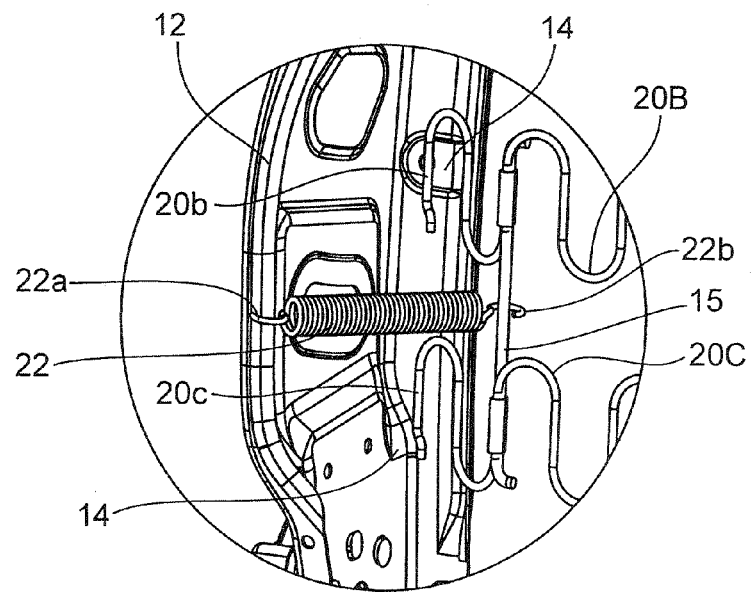
FIG. 2B is an enlarged view of the area A in FIG. 2A.

As illustrated in FIG. 2, the reclining device 5 includes right and left reclining devices interlockably coupled together by a coupling shaft 7. One of the reclining devices 5 is provided with an operating lever 6, as illustrated in FIG. 1. An occupant can manipulate the operating lever 6 to interlockingly operate the right and left reclining devices 5 coupled together by the coupling shaft 7 so as to adjust the inclination angle of the seat back 3 with respect to the seat cushion 2.

As illustrated in FIG. 2, a back frame 10 is provided inside the seat back 3 to support the headrest 4.

The back frame 10 comprises a generally inverted U-shaped upper frame 11, right and left side frames 12 attached to respective right and left lower ends of the upper frame 11 to extend downwardly from the respective right and left lower ends, and a lower frame 13 mutually coupling respective lower ends of the right and left side frames 12. The upper frame 11 is provided with a pair of right and left headrest support portions 11a each adapted to allow a non-illustrated pole of the headrest 4 to be inserted thereinto.

Each of the right and left side frames 12 has three spring fixing pieces 14 fixed thereto by welding or the like, at respective appropriate positions in an up-down direction.

The back frame 10 further comprises three support spring members 20A, 20B, 20C provided between the right and left side frames 12 in a tensioned state to extend in a right-left direction to mutually couple the right and left side frames 12. The support spring members 20A, 20B, 20C are arranged in mutually spaced-apart relation in the up-down direction, and each of the support spring members 20A, 20B, 20C has opposite right and left ends 20a, 20b, 20c each fixed to an associated one of the three spring fixing pieces 14 in a respective one of the right and left side frames 12.

Each of the support spring members 20A, 20B, 20C is formed into a wave shape consisting of a series of S shapes (S spring), and configured to be able to support an upper body of an occupant seated in the seat 1. The support spring member 20A, i.e., an uppermost one of the three support spring members, is adapted to support a central region of a back of the occupant, and the support spring members 20B, 20C, i.e., lower two of the three support spring members, are adapted to support a lumber region of the occupant. The two lower support spring members 20B, 20C will hereinafter be referred to collectively as "support spring unit".

Specifically, when a rearward load is applied from the occupant to the support spring members 20A, 20B, 20C, an intermediate portion of each of the support spring members 20A, 20B, 20C undergoes bending deformation causing rearward displacement thereof, and the occupant's upper body is supported by a restoring force generated in association with the deformation. Each of the two lower support spring members 20B, 20C is equivalent to the "support spring member" set forth in the appended claims.

The support spring members 20B, 20C (support spring unit) are integrally coupled by right and left coupling members 15 each extending in the up-down direction, at respective positions inwardly apart from the right and left ends 20b, 20c thereof.

Figure 5A:
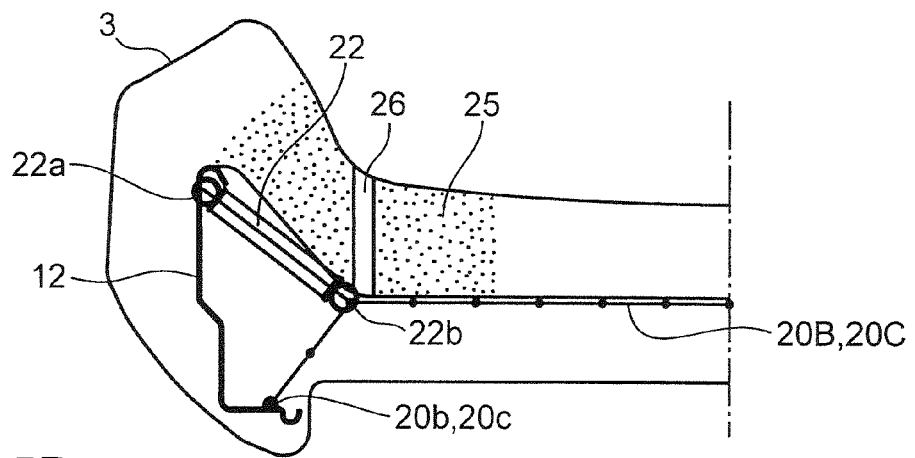

Each of the support spring members 20B, 20C is preshaped such that a central region thereof located between the right and left ends 20b, 20c protrudes frontwardly relative to the right and left ends 20b, 20c in an approximately flat state, to have a generally trapezoidal shape in top plan view. As used here, the term "generally trapezoidal shape" means a shape illustrated in FIG. 5A. In this regard, it is to be noted that FIG. 5A depicts only a left half of the support spring member, and the generally trapezoidal shape in top plan view is formed by adding a right half of the support spring member symmetrical with the left half. More specifically, in top plan view, each of the support spring members 20B, 20C has right and left inclined regions, and a central region as a region other than the inclined regions. Each of the right and left inclined regions is formed to rise obliquely frontwardly from a respective one of the right and left ends 20b, 20c thereof toward a center side (formed to extend between a respective one of the right and left ends 20b, 20c thereof and a coupling point with an end 22b of an aftermentioned return spring member 22. The central region is formed to be approximately flat.

In the following description, the term "frontwardly protruding central region" will be used as a meaning of "a wide range of central region which protrudes frontwardly relative to the right and left ends 20b, 20c in an approximately flat state, to have a generally trapezoidal shape in top plan view (i.e., a shape illustrated in FIG. 5A), instead of a meaning of a central region having a significantly convex shape.

Figure 5B:
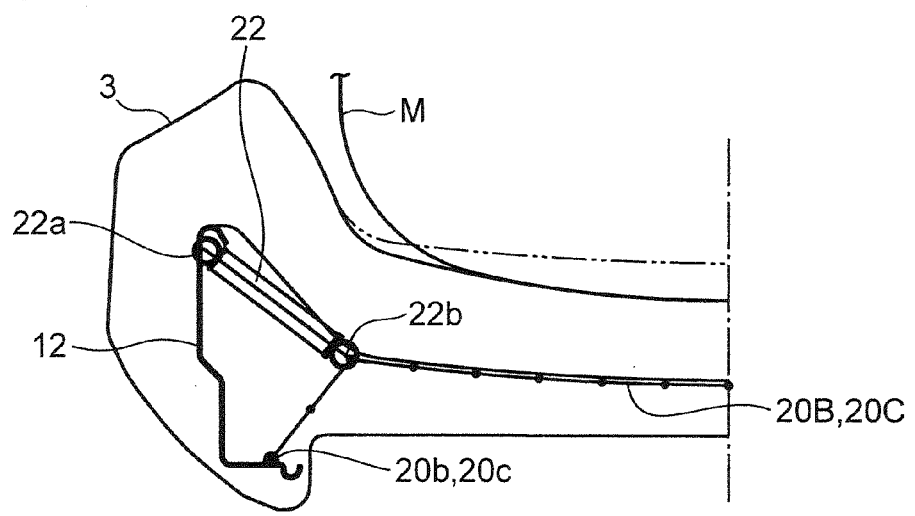

The central region of each of the support spring members 20B, 20C is shaped in the above manner. Thus, when a load applied to the central regions of the support spring members 20B, 20C is less than a predetermined value, a rearward bending of the central regions is restricted by the support spring members 20B, 20C themselves, so that it becomes possible to allow a lumber region of a seated occupant to be adequately supported by the support spring members 20B, 20C. The state of being "less than a predetermined value" means a no-load (unseated) state in which no load is applied from a back M of an occupant to the seat back 3, as illustrated in FIG. 5A, or a seated state in which a light load is applied from the occupant's back M to the seat back 3, as illustrated in FIG. 5B. In this embodiment, it is assumed that the load from the occupant's back M is generally in the range of about 80 to 120 Kgs.

Figure 5C:
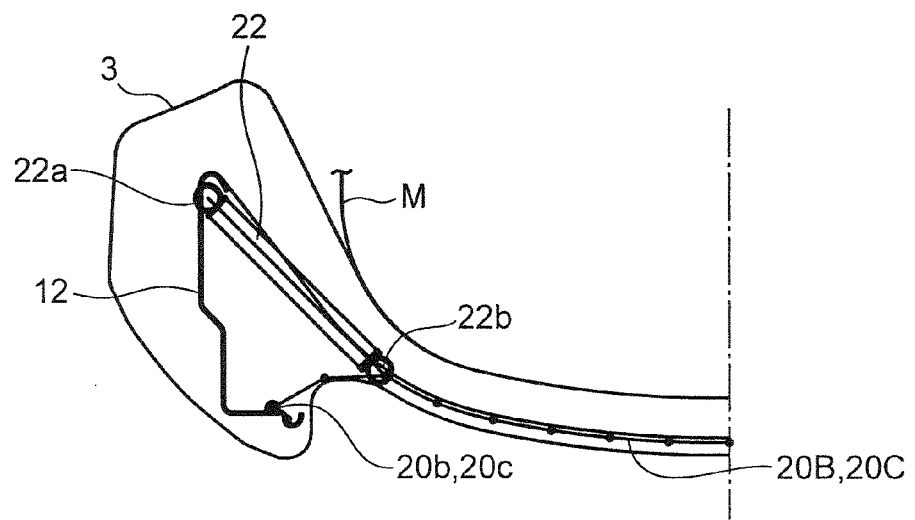

On the other hand, when the load applied to the frontwardly protruding central regions of the support spring members 20B, 20C becomes equal to or greater than the predetermined value, the central regions of the support spring members 20B, 20C are largely bent (depressed) rearwardly. The state of being "equal to or greater than the predetermined value" means a rear impact event in which a heavy load is applied from the occupant's back M to the seat back 3, as illustrated in FIG. 5C.

The right and left side frames 12 are provided, respectively, with right and left return spring members (coil springs) 22 each having one end 22a locked to a front portion of a respective one of the right and left side frames 12 at a position approximately intermediate between the support spring members 20B, 20C in the up-down direction. Each of the right and left return spring members 22 has the other end 22b locked to a respective one of the right and left coupling members 15 located inwardly with respect to the right and left ends 20b, 20c of each of the support spring members 20B, 20C. Each of the right and left return spring members 22 is provided in a number of one. In top plan view, for example, as illustrated in FIG. 5A, a coupling point between the other end 22b of one of the right and left return spring members 22 and a respective one of the right and left coupling members 15 is located at a border between the central region and a region adjacent to a respective one of the right and left ends 20b, 20c of the support spring member 20B, 20C.

In the vehicle seat 1 according to the above embodiment, each of the support spring members 20B, 20C is shaped such that a central region thereof protrudes frontwardly in an approximately flat state. Thus, in a normal state, such as a no-load state or a seated state in which a load applied to the central regions of the support spring members 20B, 20C is less than a predetermined value, a rearward bending of the central regions is restricted by the support spring members 20B, 20C themselves, so that it becomes possible to allow a lumber region of a seated occupant to be adequately supported by the support spring members 20B, 20C.

On the other hand, in a situation where the load applied to the frontwardly protruding central regions of the support spring members 20B, 20C becomes equal to or greater than the predetermined value, for example, when a rearward load is applied thereto during a rear impact event, the central regions of the support spring members 20B, 20C are largely bent (depressed) rearwardly.

Figure 4:
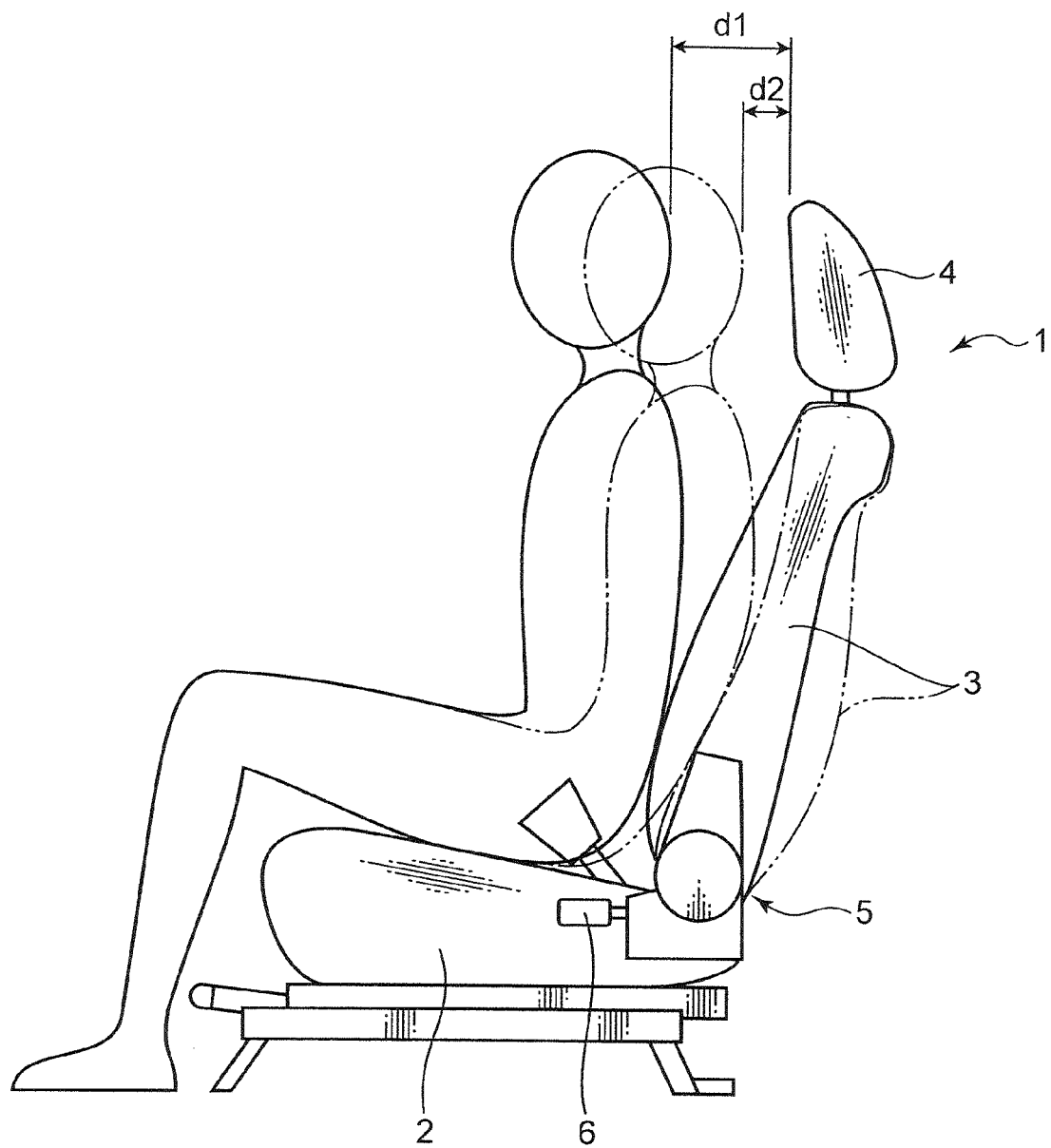
FIG. 4 is a side view illustrating a positional relationship between an occupant and a seat back.

This allows the occupant's upper body to deeply sink down into the seat back together with the lumber region, so that a gap between a head of the occupant and the headrest 4 is reduced (d1→d2) as illustrated in FIG. 4 to lessen a load to be imposed on the occupant's head.

The rearwardly largely bent (depressed) central regions of the support spring members 20B, 20C will automatically return to the frontwardly protruding shape according to their spring force.

As above, the vehicle seat according to this embodiment makes it possible to achieve both support of a lumber region of an occupant and protection of a head of the occupant during a rear impact event, with a simple structure in which each of the support spring members 20B, 20C is configured such that the central region thereof protrudes frontwardly in an approximately flat state.

In the above embodiment, the two, right and left, return spring members 22 are provided. Thus, it becomes possible to, when the frontwardly protruding central regions of the support spring members 20B, 20C are depressed rearwardly by a rearward load, allow the depressed central region of each of the support spring members 20B, 20C to reliably return to the frontwardly protruding shape by the assistance of a spring force of the return spring members 22.

In the above embodiment, each of the right and left return spring members 22 is disposed to support the border between the central region and the region adjacent to a respective one of the right and left ends 20b, 20c of the support spring member 20B, 20C. Thus, it becomes possible to prevent the central region of each of the support spring members 20B, 20C from collapsing in a right-left direction.

In addition, based on adjusting the spring force of the return spring member 22, seating feeling in a situation where a normal seating load is applied to the support spring unit 20B, 20C can be easily adjusted, and an operating load during a rear impact event can also be easily adjusted.

In the above embodiment, the support spring members 20B, 20C are coupled together by each of the right and left coupling members 15. Further, the one end 22a of each of the two, right and left, return spring members 22, is locked to the front portion of a respective one of the right and left side frames 12, and the other end 22b thereof is locked to a respective one of the right and left coupling members 15 each coupling the support spring members 20B, 20C. This makes it possible to facilitate structural simplification, as compared to cases where the return spring member 22 is provided with respect to each of the support spring members 20B, 20C.

In the above embodiment, the other end 22b of each of the two, right and left, return spring members 22, is locked to a respective one of the right and left coupling members 15 each coupling the support spring members 20B, 20C. Alternatively, the coupling members 15 may be omitted, and the return spring member 22 may be provided with respect to each of the support spring members 20B, 20C.

In the above embodiment, a cushion pad 25 is housed in a space defined by the right and left side frames 12 and the back frame 10, at a position in front of the support spring members 20A, 20B, 20C, as partially indicated by the dots in FIG. 5A, to support a back of the occupant's upper body. As illustrated in FIGS. 2A and 5A, the cushion pad 25 has right and left slits 26 formed in respective opposite lateral portions thereof to extend in an up-down direction.

Thus, a portion of the cushion pad 25 between the right and left slits 26 allows the occupant's upper body to sink down into the seat back 3 together with the lumber region, more quickly and more deeply.

SUMMARY OF THE EMBODIMENT

The present invention provides a vehicle seat 1 which comprises: a seat back 3; a headrest 4; and a back frame 10 provided inside the seat back 3 to support the headrest 4, wherein the back frame 10 includes right and left side frames 12, 12, and a support spring unit 20B, 20C having opposite right and left ends 20b, 20c locked between the right and left side frames 12, 12 and extending in a right-left direction to support a lumber region of an occupant, and wherein the support spring unit 20B, 20C is shaped such that a central region thereof protrudes frontwardly relative to the right and left ends thereof in an approximately flat state.

In the vehicle seat of the present invention, the support spring unit is shaped such that the central region thereof protrudes frontwardly in an approximately flat state. Thus, in a normal state, such as a no-load state or a seated state in which a load applied to the central region of the support spring unit is less than a predetermined value, a rearward bending of the central region is restricted by the support spring unit itself, so that it becomes possible to allow a lumber region of a seated occupant to be adequately supported by the support spring unit.

On the other hand, in a situation where the load applied to the frontwardly protruding central region of the support spring unit becomes equal to or greater than the predetermined value, for example, when a rearward load is applied thereto during a rear impact event, the central region of the support spring unit is largely bent (depressed) rearwardly.

This allows an upper body of the occupant to deeply sink down into the seat back together with the lumber region, so that a gap between a head of the occupant and the headrest is reduced to lessen a load to be imposed on the occupant's head. The rearwardly largely bent (depressed) central region of the support spring unit will automatically return to the frontwardly protruding shape according to its spring force.

As above, the present invention makes it possible to achieve both support of a lumber region of an occupant and protection of a head of the occupant during a rear impact event, with a simple structure in which the support spring unit is configured such that the central region thereof protrudes frontwardly in an approximately flat state.

Preferably, the vehicle seat of the present invention further comprises a return spring member 22 having one end 22a locked to one of the right and left side frames 12, 12 and the other end 22b locked to the support spring unit 20B, 20C, wherein the return spring member 22 is adapted, when the frontwardly protruding central region of the support spring unit 20B, 20C is depressed rearwardly due to a rearward load applied thereto, to bias the central region of the support spring unit 20B, 20C in a direction for causing it to return to the frontwardly protruding shape.

According to the above feature, it becomes possible to, when the frontwardly protruding central region of the support spring unit 20B, 20C is depressed rearwardly by a rearward load, allow the depressed central region of the support spring unit to reliably return to the frontwardly protruding shape by the assistance of a spring force of the return spring member 22.

In addition, based on adjusting the spring force of the return spring member 22, seating feeling in a situation where a normal seating load is applied to the support spring unit 20B, 20C can be easily adjusted, and an operating load during a rear impact event can also be easily adjusted.

More preferably, in the above vehicle seat, the support spring unit comprises a plurality of support spring members 20B, 20C arranged between the right and left side frames 12, 12 in mutually spaced-apart relation in an up-down direction, wherein the vehicle seat includes a coupling members 15, 15 provided on right and left sides of the vehicle seat to couple the plurality of support spring members 20B, 20C together, and wherein the return spring member is provided on the right and left sides of the vehicle seat, and wherein the one end 22a and the other end 22b of each of the return spring members 22, 22 are locked to a corresponding one of the right and left side frames 12, 12 and a corresponding one of the right and left coupling members 15, 15, respectively.

In this case, each of the right and left return spring members 22, 22 may be disposed to support a border between the central region and a region adjacent to a respective one of the right and left ends 20b, 20c of the support spring member 20B, 20C. This makes it possible to prevent the central region of each of the support spring members 20B, 20C from collapsing in a right-left direction.

Further, the support spring members 20B, 20C arranged in the up-down direction may be coupled by the right and left coupling members 15, 15 at respective positions inwardly apart from the right and left ends thereof (borders between the central region and respective regions adjacent to the right and left ends 20b, 20c of the support spring member 20B, 20C). This makes it possible to facilitate structural simplification, as compared to cases where the return spring member 22 is provided with respect to each of the support spring members.

Preferably, in the vehicle seat of the present invention, the support spring unit 20B, 20C comprises a plurality of support spring members 20B, 20C arranged in an up-down direction, wherein each of the plurality of support spring members 20B, 20C is shaped such that a central region thereof protrudes frontwardly relative to the right and left ends thereof in an approximately flat state, to have a generally trapezoidal shape in top plan view.

More preferably, in the above vehicle seat, each of the support spring members 20B, 20C is formed into a wave shape consisting of a series of S shapes.

More preferably, in the above vehicle seat, each of the support spring members 20B, 20C is shaped such that the central region thereof is formed into a series of S shapes in front view, and a region extending from each of the right and left ends to the central region thereof is formed into an S shape in side view.

According to the above features, it becomes possible to produce the support spring unit using a relatively simple component. As above, each of the support spring members 20B, 20C composed of the support spring unit is made up of a spring member having a wave shape consisting of a series of S shapes, and shaped to have a series of S shapes in front view and have a generally S shape in side view. This makes it possible to allow the central region of each of the support spring members 20B, 20C to protrude frontwardly relative to the right and left ends 20b, 20c thereof, with a relatively simple configuration.

Preferably, the vehicle seat of the present invention comprises a cushion pad housed in a space defined by the right and left side frames and the back frame, at a position in front of the support spring unit, to support a back of an upper body of the occupant, wherein the cushion pad has right and left slits formed in respective opposite lateral portions thereof to extend in an up-down direction.

According to this feature, a cushion pad is housed in a space defined by the right and left side frames and the back frame, at a position in front of the support spring unit, to support a back of an upper body of the occupant, and slits are formed in respective opposite lateral portions of the cushion pad to extend in an up-down direction. This makes it possible to allow the occupant's upper body to sink down into the seat back together with the lumber region, more quickly and more deeply.

This application is based on Japanese Patent Application Serial No. 2011-107176 filed in Japan Patent Office on May 12, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle seat comprising:
    a seat back;
    a headrest; and
    a back frame provided inside the seat back to support the headrest, the back frame including:
        right and left side frames, and
        a support spring unit having opposite right and left ends fixed respectively to the right and left side frames and extending in a right-left direction to support a lumber region of an occupant,
        right and left return spring members, the right return spring member having a first end locked to the right side frame and a second end locked to the support spring unit, the left return spring member having a first end locked to the left side frame and a second end locked to the support spring unit
        wherein the support spring unit comprises a plurality of support spring members arranged in an up-down direction, each of the support spring members being shaped such that a central region thereof protrudes frontwardly relative to the right and left ends thereof in an approximately flat state to have a generally trapezoidal shape in top plan view, and
        the return spring members are configured, when the frontwardly protruding central region of the support spring unit is depressed rearward due to a rearward load applied thereto, to bias the central region of the support spring unit in a direction for causing the support spring unit to return to the frontwardly protruding shape and to return the central region of the support spring unit to the frontwardly protruding shape by a spring force of the return spring members.

2. The vehicle seat as defined in claim 1, which comprises a cushion pad housed in a space defined by the right and left side frames and the back frame, at a position in front of the support spring unit, to support a back of an upper body of the occupant, the cushion pad having right and left slits formed in respective opposite lateral portions thereof to extend in an up-down direction.

3. The vehicle seat as defined in claim 1, wherein
    the vehicle seat includes right and left coupling members provided respectively on right and left sides of the vehicle seat to couple the plurality of support spring members together, and
    the second ends of the right and left return spring members are locked to the right and left coupling members respectively.

4. The vehicle seat as defined in claim 1, wherein each of the support spring members is formed into a wave shape consisting of a series of S shapes.

5. The vehicle seat as defined in claim 4, wherein each of the support spring members is shaped such that the central region thereof is formed into a series of S shapes in front view, and a region extending from each of the right and left ends to the central region thereof is formed into an S shape in side view.

* * * * *